United States Patent
Starzewski et al.

(10) Patent No.: US 6,891,007 B2
(45) Date of Patent: May 10, 2005

(54) METHOD FOR POLYMERIZING POLAR SUBSTITUTED CYCLOALKENES

(75) Inventors: Karl-Heinz Alexsander Ostoja Starzewski, Bad Vilbel (DE); Karin Weiss, Bindlach (DE); Martin Olaf Thüring, Karlstein (DE)

(73) Assignee: Bayer Aktiengesellschaft, Leverkusen (DE)

( * ) Notice: Subject to any disclaimer, the term of this patent is extended or adjusted under 35 U.S.C. 154(b) by 55 days.

(21) Appl. No.: 10/239,682

(22) PCT Filed: Mar. 19, 2001

(86) PCT No.: PCT/EP01/03118

§ 371 (c)(1),
(2), (4) Date: Sep. 24, 2002

(87) PCT Pub. No.: WO01/72760

PCT Pub. Date: Oct. 4, 2001

(65) Prior Publication Data

US 2003/0120011 A1 Jun. 26, 2003

(30) Foreign Application Priority Data

Mar. 29, 2000 (DE) .......................................... 100 15 452

(51) Int. Cl.[7] .................................................. C08F 4/69
(52) U.S. Cl. ........................ 526/169; 526/308; 526/309; 526/310; 526/294; 526/291; 526/318; 526/319
(58) Field of Search ................................ 526/348, 280, 526/281, 336, 169

(56) References Cited

U.S. PATENT DOCUMENTS

| | | | |
|---|---|---|---|
| 3,856,758 A | 12/1974 | Ueshima et al. ........... 260/78.4 |
| 4,039,491 A | 8/1977 | Ikeda et al. ................... 260/4 R |
| 5,146,017 A | * 9/1992 | Werner et al. ............... 570/143 |
| 5,312,940 A | 5/1994 | Grubbs et al. .............. 556/136 |
| 5,545,829 A | 8/1996 | Brekner et al. ............. 526/160 |
| 5,567,777 A | 10/1996 | Tsuji et al. ................... 525/289 |
| 6,040,363 A | * 3/2000 | Warner et al. ............... 523/214 |
| 6,506,944 B1 | * 1/2003 | Schwab et al. ............. 568/459 |
| 6,525,197 B1 | * 2/2003 | Fürstner et al. ............. 544/310 |

FOREIGN PATENT DOCUMENTS

DE        198 15 275        10/1999

OTHER PUBLICATIONS

Weiss et al., Transition Metal Carbyne Complexes, 1993, 55–66.*

Klaui et al., J. Organomet. Chem. 1998, 553, 241–251 (abstract only).*

Aldrich Chemical Catalogue (1998–1999) p. 292.*

**K. Weiss, R. Goller, M. Denzer, L. Lössel, J. Ködel: "Transition Metal Carbyne Complexes" 1993, F.R. Kreissel, Kluwer, Dodrecht, NL XP002170686 Seite 55—Seite 66; Tabellen 2,3.

* cited by examiner

*Primary Examiner*—David W. Wu
*Assistant Examiner*—Rip A. Lee
(74) *Attorney, Agent, or Firm*—Diderico Van Eyl; Jennifer R. Seng; Jill Denesvich

(57) ABSTRACT

This invention relates to a process for polymerizing polar substituted norbornenes and/or cycloalkenes, optionally, in the presence of another unsaturated compound. The method is characterized in that the polymerization is carried out in the presence of one or more tungsten carbine complexes.

2 Claims, No Drawings

METHOD FOR POLYMERIZING POLAR SUBSTITUTED CYCLOALKENES

FIELD OF THE INVENTION

The present invention relates to a process for the (co)polymerisation of polar substituted nobornenes and/or cycloalkenes optionally in the presence of a further unsaturated compound, characterised in that the polymerisation is carried out in the presence of one or more tungsten-carbyne complexes and/or molybdenum-carbyne complexes.

BACKGROUND OF THE INVENTION

Cycloolefin (co)polymers are characterised by many advantageous properties, including a high transparency for use for optical applications. They have a good thermal stability, ageing resistance, chemical resistance, good gas barrier properties, solvent resistance, low water absorption, high scratch resistance, low double refraction and high softening temperatures (glass transition temperatures $T_g$). Such (co)polymers are therefore suitable for, inter alia: films in unstretched or monoaxially or biaxially stretched form for packagings and as cover layers for polarisation films and liquid crystal displays, as materials for optical data storage media, lacquer constituents, for example for the automobile industry in order to render surfaces scratch resistant; fibres, for example for light-conducting fibres, optical lenses and prisms; flexible hoses, tubings, rods, bars and carrier plates; cover discs for solar cells; capacitor dielectric material. Such technical articles are produced by injection moulding or extrusion. The (co)polymers that are used are amorphous or only partially crystalline. The (co)polymers may be employed alone or mixed with other polymers.

The polymerisation of cyano-substituted norbornene derivatives is in principle known from DE-A-2 316 087. As catalysts for the ring-opening polymerisation of the norbornenes there are used tungsten and molybdenum compounds, in particular their halides, in combination with aluminium alkyls. No metal-carbyne complexes are disclosed. The Ziegler-Natta catalysts disclosed here are not sufficiently active in the presence of polar groups.

U.S. Pat. No. 4,039,491 discloses norbornene polymers and copolymers produced from norbornene monomers using tungsten and molybdenum compounds and organometallic compounds of Groups 1, 2, 12 and 13 of the Periodic System according to IUPAC 1985. No metal-carbyne complexes are disclosed. The Ziegler-Natta catalysts disclosed here are not sufficiently active in the presence of polar groups.

U.S. Pat. No. 5,312,940 discloses cycloolefin polymers and their production using metal-carbene complexes as catalysts. Metal-carbyne complexes are not mentioned. In addition, the disclosed carbene complexes are complicated to synthesise.

DE-A1-199 15 275 also discloses cycloolefin polymers and their production using metal-carbene complexes as catalysts. Here too metal-carbyne complexes are also not mentioned. The disclosed carbene complexes are also difficult to synthesise.

K. Weiss, R. Goller, M. Denzner, G. Löβel, J. Ködel in *Transition Metal Carbyne Complexes*, (Editor: F. R. Kreiβl), Kluwer, Dordrecht, 1993, 55, disclose the polymerisation of non-polar substituted cycloalkenes using tungsten-carbyne complexes. The polymerisation of polar substituted cycloalkenes is not described.

SUMMARY OF THE INVENTION

The object therefore existed of providing highly effective metathesis catalysts for the homopolymerisation and copolymerisation of polar substituted cycloolefins, in particular polar substituted norbornenes.

The object also existed of at least partially avoiding the disadvantages of the processes known in the prior art.

The object furthermore existed of providing alternative metathesis catalysts for the homopolymerisation and copolymerisation of polar substituted cycloolefins, in particular polar substituted norbornenes.

These objects are achieved according to the invention by the provision of a process for the polymerisation of polar substituted cycloalkenes, optionally in the presence of one or more other saturated compounds, characterised in that the polymerisation is carried out in the presence of one or more tungsten-carbyne complexes and/or molybdenum-carbyne complexes.

DETAILED DESCRIPTION OF THE INVENTION

Cycloalkenes are monocyclic or polycyclic and fall under one of the following two formulae

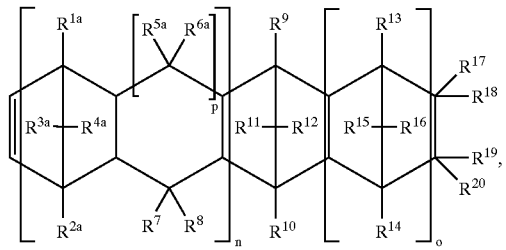

in which the indices
m denotes a number from 2 to 10, preferably 3 to 6,
n denotes the number 0 or 1,
o denotes the number 0, 1, 2 or 3, and
p denotes the number 0 or 1,
in the formula (I) two adjacent $CH_2$ groups may be replaced by the group —CH=CH— and in formula (II) the radicals $R^{1a}$ to $R^{6a}$ and $R^7$ to $R^{20}$ independently of one another denote hydrogen, fluorine, chlorine, bromine, straight-chain or branched $C_1$–$C_{20}$-alkyl, $C_3$–$C_8$-cycloalkyl or $C_6$–$C_{16}$-aryl, in which in addition the remaining pair $R^{18}/R^{19}$ may denote a double bond or one of the groups —$CHR^{21}$—$CHR^{22}$—$CHR^{23}$—, —$CHR^{21}$—$CHR^{22}$—$CHR^{23}$—$CHR^{24}$— or —$CHR^{21}$—$CHR^{22}$—$CHR^{23}$—$CHR^{24}$—$CHR^{25}$—, in which $R^{21}$ to $R^{25}$ are hydrogen or $C_1$–$C_4$-alkyl, and the remaining pair $R^{17}/R^{18}$ may denote the doubly bonded group =$C(R^{26},R^{27})$, in which $R^{26}$ and $R^{27}$ are $C_1$–$C_4$-alkyl and $R^{27}$ may also be hydrogen, in which one or more radicals is/are replaced by a polar radical selected from the group comprising CN, halogen, —$CF_3$, —$C_2F_5$ to $C_{20}$—$F_{41}$, —$N(C_1$–$C_{30}$-alkyl$)_2$, $C_1$–$C_{12}$-alkoxy or $C_1$–$C_{20}$-alkylene-$COOC_1$–$C_{20}$-alkyl, —OH, —OR. Obviously the compounds may also contain several optionally different polar substituents.

Such cycloalkenes have one or more, preferably one or two, double bonds and are known and employed for example in the processes described in EP-A 610 852, EP-A 690 078 and U.S. Pat. No. 5,567,777.

Preferred cycloalkenes of the formula (II) are those of the formulae

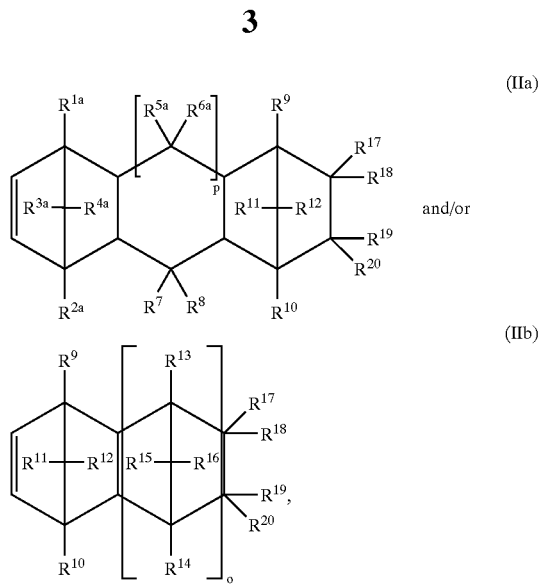

(IIa) and/or (IIb)

wherein the radicals R and the indices have the meanings already given above, in which in these aforementioned parent substances at arbitrary positions one or more radicals is/are replaced by a polar group selected from the group comprising —CN, halogen, —CF$_3$, —C$_2$F$_5$ to C$_{20}$—F$_{41}$, —N(C$_1$–C$_{30}$-alkyl)$_2$, C$_1$–C$_{12}$-alkoxy or C$_1$–C$_{20}$-alkylene-COOC$_1$–C$_{20}$-alkyl, —OH, —OR. Obviously the compounds may also contain several polar, optionally different substituents.

An exemplary but not exhaustive list of such parent cycloalkenes includes cyclobutene, cyclopentene, cyclopentadiene, cyclohexene, cycloheptene, cyclo-octene, cyclodecene, cyclododecene, bicyclo-2-heptenes, tricyclo-3-decenes, tricyclo-3-undecenes, tetracyclo-3-dodecenes, pentacyclo-4-pentadecenes, pentacyclopentadecadienes, pentacyclo-3-pentadecenes, pentacyclo-4-hexadecenes, pentacyclo-3-hexadecenes, hexacyclo-4-heptadecenes, heptacyclo-5-eicosenes, heptacyclo-4-eicosenes, heptacyclo-5-heneicosenes, octacyclo-5-docosenes, nonacyclo-5-pentacosenes, nonacyclo-6-hexacosenes, cyclopentadiene/acenaphthylene adducts, 1,4-methano-[1.4.4a.9a]-tetrahydrofluorenes and 1,4-methano-[1.4.4a.5.10.10a]-hexahydroanthracenes, such as bicyclo [2.2.1]-hept-2-ene(nobornenes), norbornadiene, 5-methyl-norbornene, 6-methyl-norbornene, 5,6-dimethyl-nobornenes, 1-methyl-norbornene, 5-isobutyt-norbornene, 7-methyl-norbornene, tricyclo[4.3.0.1$^{2,5}$]-3-decene(5,6-trimethylene-norbornene), tricyclo-[4.4.0.1$^{2,5}$]-3-undecene (5,6-tetramethylene-norbornene), 10-methyltricyclo-[4.4.0.1$^{2,5}$]-3-undecene, 6-ethylbicyclo[2.2.1]hept-2-ene, 6-n-butylbicyclo[2.2.1]-hept-2-ene, 6-isobutylbicyclo[2.2.1]hept-2-ene, 2-methyltricyclo[4.3.0.1$^{2,5}$]-3-decene, 5-methyltricyclo[4.3.0.1$^{2,5}$]-3-decene, tricyclo[4.3.0.1$^{2,5}$]-3-undecene, tricyclo-[4.3.0.1$^{2,5}$]-3,7-decadiene (dicyclopentadiene), tricyclo[4.3.0.1$^{2,5}$]-3-decene, tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-stearyltelracyclo[4.4.0.1$^{2,}$$_5$.1$^{7,10}$]-3-dodecene, the 5,10-dimethyl, 2,10-methyl, 8,9-dimethyl, 11,12-dimethyl, 2,7,9-trimethyl, 9-isobutyl, 11,12-dimethyl, 8-ethylidene-9-methyl, 8-chloro, 8-bromo or 8-fluoro derivatives of tetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-propyltetracyclo[4.4.0.1$^{2,5}$.1$^{7,10}$]-3-dodecene, 8-butyltetracyclo[4.4.0.1$^{2,5}$.1$^{7,10}$]-3-dodecene, 8-isobutyltetracyclo[4.4.0.1$^{2,5}$.1$^{7,10}$]-3-dodecene, 8-hexyltetracyclo[4.4.0.1$^{2,5}$.1$^{7,10}$]-3-dodecene, 8-methyl-9-ethyltetra-cyclo[4.4.0.1$^{2,5}$.1$^{7,10}$]-3-dodecene, 9-ethyl-2,7-dimethyltetracyclo[4.4.0.1$^{2,5}$.1$^{7,10}$]-3-dodecene, 9-isobutyl-2,7-dimethyltetracyclo[4.4.0.1$^{2,5}$.1$^{7,10}$]-3-dodecene, 9,11,12-trimethyltetracyclo[4.4.0.1$^{2,5}$.1$^{7,10}$]-3-dodecene, 9-ethyl-11,12-dimethyltetracyclo-[4.4.0.1$^{2,5}$.1$^{7,10}$]-3-dodecene, 9-isobutyl-11,12-dimethyltetracyclo[4.4.0.1$^{2,5}$.1$^{7,10}$]-3-dodecene, 5,8,9,10-tetramethyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-ethylidene-9-methyltetracyclo-[4.4.0.1$^{2,5}$.1$^{7,}$$_{10}$]-3-dodecene, 8-ethylidene-9-ethyltetracyclo[4.4.0.1$^{2,5}$.1$^{7,}$$_{10}$]-3-dodecene, 8-ethylidene-9isopropyltetracyclo[4.4.0.1$^{2,}$$_5$.1$^{7,10}$]-3-dodecene, 8-ethylidene-8-butyltetracyclo [4.4.0.1$^{2,5}$.1$^{7,10}$]-3-dodecene, 8-n-propylidenetetracyclo [4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,}$$_{10}$]-3-dodecene, 8-isoprapylidenetetracyclo[4.4.0.1$^{2,5}$.1$^{7,10}$]-3-dodecene, 8-isopropylidene-9-methyltetracyclo[4.4.0.1$^{2,}$$_5$.1$^{7,10}$]-3-dodecene, 8-isopropylidene-9-ethyltetracyclo [4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-isopropylidene-9-butyltetracyclo-[4.4.0.1$^{2,5}$.1$^{7,10}$]-3dodecene, 8,9-dichlorotetracyclo[4.4.0.1$^{2,5}$.1$^{7,10}$]-3-dodecene, pentacyclo[6.5.1.1$^{3,6}$.0$^{2,7\cdot}$.0$^{9,13}$]-4-pentadecene, pentacyclo[7.4.0.1$^{2,5}$.1$^{9,12}$.0$^{8,13}$]-3-pentadecene, pentacyclo [8.4.0.1$^{2,5}$.1$^{9,12}$.0$^{8,13}$]-3-hexadecene, 1,3-dimethyl-pentacyclo-[6.5.1.1$^{3,6}$.0$^{2,7\cdot}$.0$^{9,13}$]-4-pentadecene, 1,6-dimethyl[6.5.1.1$^{3,6}$.0$^{2,7\cdot}$.0$^{9,13}$]-4-pentadecene, 14,15-dimethyl[6.5.1.1$^{3,6}$.0$^{2,7\cdot}$.0$^{9,13}$]-4-pentadecene, pentacyclo [7.4.0.1$^{2,5}$.1$^{9,12}$.0$^{8,13}$]-3-pentadecene, methyl-substituted penlacyclo[7.4.0.1$^{2,5}$.1$^{9,12}$.0$^{8,13}$]-3-pentadecene, pentacyclo [6.5.1.1$^{3,6}$.0$^{2,7}$.0$^{9,13}$]-4,10-pentadecadiene, 11-methylpentacyclo[8.4.0.1$^{2,5}$.1$^{9,12}$.0$^{8,13}$]-3-3-hexadecene, 11-ethyl [8.4.0.1$^{2,5}$.1$^{9,12}$.0$^{8,13}$]-3-hexadecene, 10,11-dimethyl [8.4.0.1$^{2,5}$.1$^{9,12}$.0$^{8,13}$]-3-hexadecene, pentacyclo[6.6.1.1$^{3,}$$_6$.0$^{2,7\cdot}$.0$^{9,14}$]-4-hexadecene, 1,3-dimethyl-pentacyclo [6.6.1.1$^{3,6}$.0$^{2,7\cdot}$.0$^{9,14}$]-4-hexadecene, 15,16-dimethyl-pentacyclo[6.6.1.1$^{3,6}$.0$^{2,7\cdot}$.0$^{9,14}$]-4-hexadecene, hexacyclo [6.6.1.1$^{3,6}$.1$^{10,13}$.0$^{2,7\cdot}$.0$^{9,14}$]heptadecene, heptacyclo [8.7.0.1$^{2,9}$.1$^{4,7}$.1$^{11,17}$.0$^{3,8}$.0$^{12,16}$]-5-eicosene, heptacyclo-[8.8.0.1$^{4,7}$.1$^{11,18}$.1$^{13,16}$.0$^{3,8}$.0$^{12,17}$]-5-heneicosene, 12-methylhexacyclo[6.6.1.1$^{3,6}$.1$^{10,13}$.0$^{2,7\cdot}$.0$^{9,14}$]-4-heptadecene, 12-ethylhexacyclo[6.6.1.1$^{3,6}$.1$^{10,13}$.0$^{2,7\cdot}$.0$^{9,}$$_{14}$]-4-heptadecene, 12-isobutylhexacyclo[6.6.1.1$^{3,6}$.1$^{10,}$$_{13}$.0$^{2,7\cdot}$.0$^{9,14}$]-4-heptadecene, 1,6,10-trimethyl-hexacyclo [6.6.1.1$^{3,6}$.1$^{10,13}$.0$^{2,7\cdot}$.0$^{9,14}$]-4-heptadecene, heptacyclo [8.7.0.1$^{3,6}$.1$^{10,17}$.1$^{12,15}$.0$^{2,7}$.0$^{11,16}$]-4-eicosene and their dimethyl-substituted derivatives, heptacyclo[8.8.0.1$^{4,7}$.1$^{11,}$$_{18}$.1$^{13,16}$.0$^{3,8}$.0$^{12,17}$]-5-heneicosene and their trimethyl-substituted derivatives, 15-methylheptacyclo[8.8.0.1$^{4,7}$.1$^{11,}$$_{18}$.1$^{13,16}$.0$^{3,8}$.0$^{12,17}$]-5-heneicosene, 5-phenylbicyclo[2.2.1] hept-2-ene, 5-methyl-5-phenylbicyclo[2.2.1]hept-2-ene, 5-benzylbicyclo[2.2.1]hept-2-ene, 5-tolylbicyclo[2.2.1] hept-2-ene, 2-(ethylphenyl)bicyclo[2.2.1]hept-2-ene, 5-(isopropylphenyl)bicyclo[2.2.1]hept-2-ene, 5-biphenylbicyclo[2.2.1]hept-2-ene, 5-(β-naphthyl)bicyclo [2.2.1]hept-2-ene, 5-(α-naphthyl)bicyclo[2.2.1]hept-2-ene, 5-(anthracenyl)bicyclo[2.2.1]hept-2-ene, 5,6-diphenylbicyclo[2.2.1]hept-2-ene, 1,4-methano-[1.4.4a.9a]-tetrahydrofluorene, 1,4-methano[1.4.4a.5.10.10a]-hexahydroanthracene, 8-phenyltetracyclo[4.4.0.1$^{2,5}$.1$^{7,10}$]-3-dodecene, 8-methyl-8-phenyltetracyclo[4.4.0.1$^{2,5}$.1$^{7,10}$]-3-dodecene, 8-benzyl-tetracyclo[4.4.0.1$^{2,5}$.1$^{7,10}$]-3-dodecene, 8-tolyltetracyclo[4.4.0.1$^{2,5}$.1$^{7,10}$]-3-dodecene, 8-(ethylphenyl)-tetracyclo[4.4.0.1$^{2,5}$.1$^{7,10}$]-3-dodecene, 8-(isopropylphenyl)tetracyclo[4.4.0.1$^{2,5}$.1$^{7,10}$]-3-dodecene, 8,9-diphenyltetracyclo[4.4.0.1$^{2,5}$.1$^{7,10}$]-3-dodecene, 8-(biphenyl)-tetracyclo[4.4.0.1$^{2,5}$.1$^{7,10}$]-3-dodecene, 8-(β-naphthyl)tetracyclo[4.4.0.1$^{2,5}$.1$^{7,10}$]-3-dodecene, 8-(α-naphthyl)tetracyclo[4.4.0.1$^{2,5}$.1$^{7,10}$]-3-dodecene and 8-(anthracenyl)-tetracyclo[4.4.0.1$^{2,5}$.1$^{7,10}$]-3dodecene, wherein in these aforementioned parent substances at arbitrary positions one or more radicals is replaced by a polar group selected from the group —CN. Obviously the compounds may also contain several polar substituents.

Preferred cycloalkenes are also those that are substituted preferably singly to triply per molecule by halogen, —CF$_3$, C$_2$F$_5$—C$_{20}$F$_{41}$, —N(C$_1$–C$_{30}$-alkyl)$_2$, —CN, C$_1$–C$_{12}$-alkoxy or C$_1$–C$_{20}$-alkylene-COOC$_1$C$_{20}$-alkyl, hydroxy or hydroxyalkyl. Particularly preferred polar substituted cycloalkenes are nitrile norbornenes such as 5-cyano-2-norbornene and 5-cyano-5-octyl-2-norbornene.

The cycloalkenes may be polymerised optionally in the presence of unsaturated compounds, in particular non-polar substituted cycloalkenes, acyclic monoolefins or diolefins, or alkynes.

Suitable non-polar substituted cycloalkenes are all the aforementioned polar substituted cycloalkenes, with the proviso that no radicals R have been replaced by polar groups. Suitable acyclic olefins include C$_2$–C$_{40}$-α-olefins and non-conjugated diolefins such as for example ethylene, propylene, 1-butene, 1-pentene, 1-hexene, 3-methyl-1-butene, 3-methyl-1-pentene, 4-methyl-1-pentene, 4-methyl-1-hexence, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene and mixtures of these α-olefins, as well as 1,5-hexadiene, 1,6-heptadiene, 1,6- and 1,7-octadiene, 1,8-nonadiene, 1,9-decadiene, 1,11-dodecadiene, 1,19-eicodiene and mixtures of these diolefins. Mixtures of α-olefins and diolefins are also suitable.

Such olefins and diolefins may furthermore be substituted, for example by phenyl, substituted phenyl, halogen, an esterified carboxyl group or an acid anhydride group; compounds of this type are for example chloroprene, styrene, methylstyrene, chlorostyrene, fluorostyrene, indene, 4-vinylbiphenyl, vinylfluorene, vinylanthracene, methyl methacrylate, ethyl acrylate, vinyl silane, trimethylallyl silane, vinyl chloride, vinylidene chloride, tetrafluoroethylene, isobutylene, vinyl carbazole, vinyl pyrrolidone, acrylonitrile, vinyl ethers and vinyl esters. Preferred monomers are: ethylene, propylene, butene, hexene, octene, 1,5-hexadiene, 1,6-octadiene, methyl methacrylate and acetylene.

Ethylene and propylene are preferred.

The polar substituted cycloalkene of the formulae (I) and/or (II) accounts for a molar proportion of 1 to 100% of the total molar content of all employed comonomers. The unsaturated monomer accounts for a molar proportion of 99 to 0% of the total molar content of all employed comonomers. The preferred amounts of polar substituted cycloalkene to unsaturated monomer are 20:80 mole % to 80:20 mole %. In the case where polar substituted cycloalkenes of the formula (I) as well as of the formula (II) are used, their molar ratio is 10:90 mole % to 90:10 mole %. The copolymerisation of polar and non-polar substituted cycloalkenes surprisingly permits the almost complete conversion of the monomers even at relatively high monomer/catalyst ratios.

The process according to the invention is carried out homogeneously at temperatures in the range from −80° C. to +200° C. and heterogeneously at temperatures from −20° C. to +150° C. and at pressures in the range from 0.5 to 500 bar in the gaseous, solid, liquid or in the slurry phase, depending on whether a soluble or an insoluble catalyst of the afore-described type is employed. The liquid phase and/or slurry phase may be formed from the comonomers alone, i.e. without using an additional solvent/suspension agent. In the case where a solvent is used in conjunction, suitable inert solvents include for example aliphatic or cycloaliphatic hydrocarbons, petroleum spirit and/or diesel oil fractions (optionally after a hydrogenation), toluene, chlorobenzene, o-dichlorobenzene, 1,2,4-trichlorobenzene, THF, diethyl ether, chloroform, methylene chloride, dioxane, 1,2-dichloroethane, 1,1,2-triehloroethane, chlorooctane as well as solvent mixtures such as pentane/methylene chloride, hexane/methylene chloride or chloronaphthalene. In the case of solvents having a low boiling point the liquid phase can be maintained by applying a sufficient reaction pressure; these details are known to the person skilled in the art The polymers may be precipitated or reprecipitated by nonsolvents such as methanol, and then dried.

Suitable molybdenum-carbyne and/or tungsten-carbyne complexes are compounds of the general formula (III),

$$L_3M\equiv CR \qquad (II)$$

wherein

M=tungsten or molybdenum

L=identical or different, halogen, C$_1$–C$_{20}$-alkoxy, C$_6$–C$_{20}$-alkoxy, C$_6$–C$_{12}$-aroxy, sterically demanding C$_3$–C$_{20}$-alkyl, optionally substituted and/or benzannellated cyclopentadienyls, R=identical or different, C$_1$–C$_{20}$-alkyl, C$_6$–C$_{12}$-aryl, trimethylsilyl.

The following are preferred

M=tungsten

L=Cl, Br, I, C$_1$–C$_{12}$-alkoxy, phenoxy, 2,6-dimethylphenoxy, 2,6-diisopropylphenoxy, 2,6-ditert.-butylphenoxy-tert.-butoxy R=methyl, ethyl, n-propyl, i-propyl, n-butyl, t-butyl, s-butyl, neopentyl, trimethylsilyl, phenyl, substituted phenyls and triphenylsilyl.

Particularly preferred complexes are Np$_3$W≡C$^t$Bu, Cl$_3$(dme)W≡C$^t$Bu, ($^t$BuO)$_3$W≡C$^t$Bu and ($^t$BuO)$_3$W≡C$^t$Bu, wherein Np=neo-pentyl=(CH$_3$)$_3$C—CH$_2$—, dme=1,2-dimethoxyethane, $^t$Bu=tert.-butyl=(CH$_3$)$_3$C—.

As a rule the molar ratios of monomer to catalyst that are employed are in the range from 10$^5$ monomer to 1 catalyst and 50 monomer to 1 catalyst, in particular 10$^2$ monomer to 1 catalyst and 10$^4$ monomer to 1 catalyst.

The reaction times are normally in the range from a few seconds to several days, in particular in the range from 10 minutes to 24 hours. Longer reaction times are in particular appropriate if the reaction conditions lead to a precipitation of the polymer (suspension polymerisation).

If the reaction is carried out in bulk (without solvent) soluble polymers may advantageously be obtained in high yields and with high molecular weights at high monomer/catalyst ratios of for example ≧500.

The polymers obtained are characterised in general by adequate molecular weights and yields combined with good solubility of the polymers. This is surprising since when using conventional metathesis catalysts insoluble, crosslinked products of moreover low activity are often obtained that are generally unusable for industrial applications.

The products obtained in the process according to the invention have a good thermal stability, ageing resistance, chemical resistance, good gas barrier properties, solvent resistance, low water absorption, high scratch resistance, low double refraction and high softening temperatures (glass transition temperatures $T_g$). Such (co)polymers are accordingly suitable for, inter alia: films in unstretched or mono-axially or biaxially stretched form for packagings and as cover layers for polarisation films and liquid crystal displays, lacquer constituents, for example for the automobile industry in order to render surfaces scratch resistant; fibres, for example for light-conducting fibres, optical lenses and prisms; flexible hoses, tubings, rods, bars and carrier plates; cover discs for solar cells; capacitor dielectric material. Such technical articles are produced by injection moulding or extrusion. The (co)polymers that are used are amorphous or only partially crystalline. Further areas of application include, optionally after hydrogenation, optical data storage devices or typical rubber applications such as profiled sections or seals. The (co)polymers may be used alone or mixed with other polymers. Particularly suitable for use in mixtures are polystyrene, polyethylene, polypropylene, or rubbers such as BR, NBR, HNBR, IIR, EP(D)M, CR, FKM.

EXAMPLES

Example 1

Synthesis of Np$_3$W≡C$^t$Bu a) Preliminary Stage: Me$_3$Si(OMe)

200 ml of freshly distilled aniline were placed in a 500 ml Schlenk three-necked flask equipped with dropping funnel, reflux condenser and excess pressure valve. 54 ml of trimethylchlorosilane were then slowly added dropwise while stirring vigorously and the mixture was stirred for a further 15 minutes. 18 g of dried methanol were now added and the mixture was then heated for 30 minutes under reflux. The reflux condenser was replaced by a distillation bridge and the product Me$_3$Si(OMe) was distilled off (55°–58° C.). Na turnings were added to the distillate and the flask was allowed to stand overnight. (Connect up the excess pressure valve since gas is evolved.) The product was decanted the next day and distilled over a 30 cm Vigreux column (b.p.: 57° C.). $^1$H-NMR (CDCl$_3$),δ (ppm): 3.33 (s, 3 H, O—CH$_3$), 0.03 (s, 9 H, Si(CH$_3$)$_3$)
Reaction Equation

Me$_3$SiNHSiMe$_3$+2MeOH→2Me$_3$SiOMe+NH$_3$↑.

b) Preliminary Stage: Neopentyl Chloride (NpCl)
Purification of DMF (Dimethylformamide)

1420 ml of DMF, 340 ml of toluene and 70 ml of water were placed in a 2000 ml capacity flask and distilled over a 30 cm Vigreux column. Preliminary runnings ca. 500 ml. The main fraction distilled over at a boiling point of 149°–152° C. The thereby purified DMF was allowed to stand 48 hours over a 4 Å molecular sieve (heated for 1 hour at 100° C. under a vacuum of 10$^{-3}$ mbar).
Synthesis of Chloromethylene-Dimethylammonium Chloride According to D. R. Hepburn, H. R. Hudson, *J. Chem Soc. Perkin I* 1976, 754

1000 ml of dried DMF were placed in a 2000 ml Schlenk three-necked flask and cooled to −5° to 0° C. with an isopropanol/dry ice mixture. 406.0 g of PCl$_5$ were then slowly added in portions through a PVC hose connection (temperature must not rise above 0° C.). The solution first of all turned yellow, then orange, and the salt [Me$_2$NCHCl]Cl began to precipitate. After the end of the PCl$_5$ addition the reaction mixture was heated to room temperature. The brown suspension that was formed was kept overnight at −30° C. to allow complete-crystallisation of the salt. The next day the salt formed was filtered off under argon using a 2 l frit (the salt is sensitive to moisture). The salt was washed with 500 ml of DMF (until the DMF was colourless). Post-washing with 3×100 ml of ether. The white salt was dried overnight in vacuo.

Yield: 246.45 g (1.925 moles) of white crystals=98.8% relative to 1.95 moles of salt (literature 89%).
Reaction Equation

ME$_2$NCHO+PCl$_5$→$^{DMF}$[Me$_2$NCHCl]$^+$Cl$^-$+POCl$_3$

Reaction of [Me$_2$NCHCl]Cl with Neopentyl Alcohol According to D. R. Hepburn, H. R. Hudson, *J Chem. Soc. Perkin I.* 1976; 754

246.45 g of [Me$_2$NCHCl]Cl (1.925 mmoles) were added to a 2000 ml three-necked flask, suspended in 1000 ml of DMF, and cooled to 0° C. with an isopropanol/dry ice mixture. 141.41 g of neopentyl alcohol (1.604 moles) were dissolved in 50 ml of DMF in a dropping funnel and added dropwise at 0° C. The solution became warm, the salt dissolved and gas was evolved (HCl!). An isopropanol/dry ice cold trap, the contents of which are added to the flask before the distillation, may be connected between the excess pressure valve and the flask (HCl entrains NpCl, etc.). The solution was then heated and boiled under reflux for 6 hours. The solution turned black. 750 ml of water were added after cooling the solution to room temperature.

The organic phase was separated in a large separating funnel and washed three times with 100 ml of water. (Crude product: yellow liquid.) The product was dried over K$_2$CO$_3$ (stirring for 3 hours). (Yield of crude product: 147.5 g=86.3%, literature 73% before distillation.) Distillation over a Vigreux column: b.p.:83°–84° C., purity according to gas chromatography: 96.7%. Yield after distillation: 119.28 g (1.119 moles)=69.79% of colourless liquid. $^1$H-NMR (CDCl$_3$),δ (ppm) 3.29 (s, 2 H, CH$_2$), 0.98 (s, 9 H, Me).
Reaction Equation

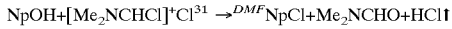
NpOH+[Me$_2$NCHCl]$^+$Cl$^{31}$ →$^{DMF}$NpCl+Me$_2$NCHO+HCl↑ c) Preliminary Stage: NpMgCl 30.2 g of magnesium turnings were weighed out into a 1000 ml Schlenk three-necked flask and heated for ca. 1–2 hours at 150° C. in vacuo (heating mantle stage 1). The turnings were then allowed to cool in vacuo.

Equip the reaction flask with a reflux condenser (ice cooling of the cooling water) and dropping funnel and place in an ultrasonic bath. The magnesium turnings were now covered with 100 ml of dry ether (ether surface ca. 1 cm over the Mg turnings) and allowed to stand for ca. 2 hours in the running ultrasonic bath (Grignard reaction starts better under these conditions! Bare surface: warm ether solution). 50 ml of NpCl were then added. The remaining 88.7 ml of NpCl were added together with 100 ml of ether to the dropping funnel. The reaction is started by adding ca. 1 ml of 1,2-dibromomethane. After the initiation of the Grignard reaction the remaining ether/NpCl solution is slowly added dropwise (duration: 2–3 hours). The reaction solution is kept for 2 days in the ultrasonic bath. The ultrasonic bath is then switched off and the Grignard solution is cooled to room temperature.

The molarity of the Grignard solution is determined by complexometric titration:
Average consumption of EDTA: 36.83 ml=>solution is 3.683 molar.
Total amount of solution: ca. 330 ml=>ca. 90% yield.

Reaction Equation

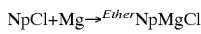

d) Preliminary Stage: LiO$^t$Bu 2.37 ml (1.853 g, 25 mmoles) of tert.-butanol were added at 0° C. to 10 ml of dry ether, followed by the addition of 15.62 ml of n-butyllithium (1.6 M in hexane, 25 mmoles). The reaction mixture was then stirred for 1 hour. Following this the solvent was removed in vacuo and the residue was sublimed at 120° C. under a high vacuum (ca. $10^{-4}$ mbar).

Yield: 90%, white solid.

$^{13}$C-NMR δ [ppm]=66.6 (CMe$_3$), 35.3 (CMe$_3$).

Reaction Equation

e) Precursor: Cl$_3$W(OMe)$_3$ according to L. B. Handy, K. G. Sharp, F. E. Brinckman, *Inorganic. Chem.* 1972, 11, 523

104 ml of Me$_3$SiOMe were placed in a 500 ml Schlenk flask under argon and cooled to 0° C. 100 g of WCl$_6$ were now added in small portions via a PVC hose connection (time ca. 10 hours!).

During the addition of the WCl$_6$ the solution turns a red-brown colour and after a few minutes becomes yellow again. Renewed addition is made only after the appearance of this yellow colour. Stir the reaction mixture overnight and allow to heat up to room temperature. Reaction time 24 hours.

The Me$_3$SiCl that is formed is removed and the residue is dissolved in ca. 100 ml of CH$_2$Cl$_2$ and filtered off (post-wash with CH$_2$Cl$_2$, pale blue residue). Remove the solvent by evaporation in vacuo and dry the brown residue in vacuo.

Yield: 88% Cl$_3$W(OMe)$_3$ (=literature yield).

$^1$H-NMR (CDCl$_3$),δ (ppm): 5.46 (s, 6 H, OCH$_3$, cis, cis), 5.40 (s, 3 H, OCH$_3$, cis, trans), $^{13}$C-NMR (CDCl$_3$),δ (ppm): 71.5, 70.5, 67.6 (OMe, cis, cis and cis, trans).

Reaction Equation

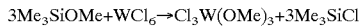

f) End stage: Np$_3$W≡C$^t$Bu 194.7 ml of NpMgCl (0.717 mole) and 6 molar parts of the Grignard solution (referred to 1 part of Cl$_3$W(OMe)$_3$) were diluted with 523 ml of dry ether under argon in a 1000 ml Schlenk flask to form a 1 molar solution. 45.81 g of Cl$_3$W(OMe)$_3$ were now added in small portions via a hose connection (time ca. 4–8 hours). The further addition takes place only after the end of the evolution of gas. The reaction mixture is then stirred overnight and allowed to stand for a further 1–2 days at room temperature. The suspension that is formed is filtered off through a large 2 l size frit and a smaller frit. Collect the filtrate in a 1000 ml flask. Allow the residue to settle during filtration. Pentane is added to the collected residue while stirring and post-washed with pentane until the wash solution is colourless. Care should be taken to ensure that the residue is completely separated since this interferes in the subsequent solids distillation. The collected pentane extracts were concentrated by evaporation in vacuo, then decanted into the solids distillation flask and concentrated further overnight at room temperature (water bath) under a high vacuum.

The vacuum required for the solids distillation should be better than $10^{-3}$ mbar. The temperature of the thermostat is raised slowly to 80° C. and then to a maximum 100° C. Decomposition occurs at higher temperatures. The distillation starts at ca 60° C. The distillation receiver is cooled with liquid N$_2$. An orange-coloured oil passes over as product, which yields a yellow solid.

Yield: 39.74 g (=71.4%). The characterisation is carried out by NMR spectroscopy.

$^1$H-NMR, (CDCl$_3$), δ [ppm]=1.39 (s, 9H, W≡CCMe$_3$), 1.04 (s, 27H, (—CH$_2$CCMe$_3$)$_3$), 0.89 (s, 6H, (—CH$_2$CMCe$_3$)$_3$), $^{13}$C-NMR, (CDCl$_3$), δ [ppm]=315.6 (W≡CCMe$_3$), 103.0 (CH$_2$CCMe$_3$), 52.5 (CCMe$_3$), 38.4 (CH$_2$CMe$_3$), 34.2 (CH$_2$CMe$_3$), 32.28 (CCMe$_3$).

Reaction Equation

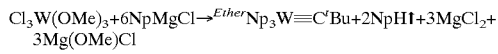

Example 2

Synthesis of Cl$_3$(dme)W≡C$^t$Bu 1.9 g (4.08 mmoles, 1 mole part) of Np$_3$W≡CCMe$_3$ from Example 1 are dissolved at 0° C. in 50 ml of pentane under argon and 1.3 ml (12.24 mmoles, 3 mole parts) of 1,2-dimethoxyethane (dme) are added.

HCl gas is then introduced directly in the argon stream from the gas cylinder into the pentane solution (only ca. 30 seconds !!!). A violet precipitate immediately begins to settle. Argon is bubbled through the suspension for ca. 15 minutes in order to remove excess HCl from the solution. The supernatant solution is decanted off and the precipitate is washed three times with 20 ml of pentane. The carbyne complex is dried under a high vacuum.

Yield: 1.41 g (77%). The characterisation is carried out by NMR spectroscopy.

$^1$H-NMR, δ [ppm]=4.43 (s, 3H, O—CH$_3$), 4.09 (t, 2H, —CH$_2$—O), 3.81 (t, 2H. —CH$_2$—O), 3.67 (s, 3H, O—CH$_3$), 1,25 (s, 9H, —C(CH$_3$)$_2$), $^{13}$C-NMR, δ [ppm]=336.4 (W≡C—C), 78.5 (—CH$_2$—O), 76.6 (O—CH$_3$), 69.7 (—CH$_2$—O), 59.6 (O—CH$_3$), 47.7 (≡C—C(CH$_3$)$_2$), 33.3 (≡C—C(CH$_3$)$_3$).

Reaction Equation

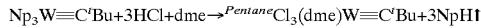

Example 3

Synthesis of ($^t$BuO)$_3$W≡C$^t$Bu 759 mg (9.48 moles, 3 mole parts) of LiO$^t$Bu are dissolved at 0° C. in dry ether. 1420 mg (3.16 mmoles, 1 mole part) of Cl$_3$(dme)W≡CCMe$_3$ from Example 2 are then added in small portions (ca. 30 minutes) and stirred for a further 1 hour (0° C.). The LiCl that is formed is allowed to settle and the supernatant solution is pipetted off. The solvent is removed under a high vacuum. 50 ml of pentane is added to the residue and the reaction mixture is kept overnight at −80° C. so that LiCl residues settle out. The supernatant solution is pipetted off and the solvent is removed in vacuo. The beige-brown carbyne complex is dried under a high vacuum. Yield: 1249 mg ($^t$BuO)$_3$W≡CCMe$_3$ (83.7%)

$^1$H-NMR, (CDCl$_3$),δ [ppm] 1.41 (s, 27 H, (OC(CH$_3$)$_3$), 1.21 (s, 9 H, W≡CC(CH$_3$)$_3$), $^{13}$C-NMR, (CDCl$_3$),δ [ppm] 271.5 (W≡CC), 78.7 (OCMe$_3$), 49.6 (CCMe$_3$), 33.9 (CCMe$_3$), 32.4 (OCMe$_3$).

Reaction Equation

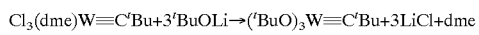

Example 4

Polymerisation of 5-cyano-2-norbornene with ($^t$BuO)$_3$W≡C$^t$Bu as Catalyst in Solution 430 mg (3.6 mmoles) of 5-cyano-2-norbornene were dissolved in 10 ml of CH$_2$Cl$_2$ and 5 ml of hexane in a 200 ml Schlenk tube that had previously been rendered inert. During the reaction 0.5 ml of decane was added as internal standard for the gas chromatography conversion determination. 17 mg (0.036 mmole) of ($^t$BuO)$_3$W≡C$^t$Bu were weighed out into a 50 ml Schlenk tube and dissolved in 1 ml of CH$_2$Cl$_2$. The molar ratio of 5-cyano-2-norbornene: ($^t$BuO)$_3$W≡C$^t$Bu is 100:1. The Schlenk tube is placed in a thermostatically controlled water bath (25° C.). The polymerisation is started by adding the catalyst solution to the monomer solution. After 24 hours the reaction is terminated with 0.1 ml of benzaldehyde and the polymer is precipitated with 100 ml of methanol and filtered. For purposes of purification the polymer is dissolved in 10 ml of CH$_2$Cl$_2$ and reprecipitated in 100 ml of methanol, filtered, and dried in vacuo ($10^{-3}$ mbar) at 25° C. to constant weight. The yield of polymer is 375 mg=87.2%. The poly(5-cyano-2-norbornene) formed had a molecular weight of $\overline{M}_w$=13,700 g/mole, and the polymer dispersity was D=3.18.

Example 5

Polymerisation of 5-cyano-2-norbornene with ($^t$BuO)$_3$W≡C$^t$Bu as Catalyst in Bulk 22 mg (46.6 μmoles) of ($^t$BuO)$_3$W≡C$^t$Bu were weighed out into a 150 ml Schlenk tube that had previously been rendered inert. 2775 mg of 5-cyano-2-norbornene (23.3 mmoles, molar ratio of 5-cyano-2-norbornene: ($^t$BuO)$_3$W≡C$^t$Bu=500:1) were then added and the mixture was thoroughly mixed. The Schlenk tube is placed in a thermostatically controlled water bath (25° C.). The polymerisation is carried out immediately and the reaction mixture becomes warm and viscous. After a reaction time of 60 minutes the polymer formed is dissolved in 20 ml of CH$_2$Cl$_2$ and the reaction is terminated by adding 0.1 ml of benzaldehyde. The poly(5-cyano-2-norbornene) that is formed is precipitated in 100 ml of MeOH. A white polymer is obtained. Yield 2636 mg=95% poly(5-cyano-2-norbornene). The poly(5-cyano-2-norbornene) formed had a molecular weight of $\overline{M}_w$=583,400 g/mole, and the polymer dispersity was D=2.32.

Example 6

Polymerisation of 5-cyano-2-norbornene with Cl$_3$(dme)W≡C$^t$Bu as Catalyst in Solution Similarly to Example 4, 5-cyano-2-norbornene was reacted with the tungsten-carbyne complex Cl$_3$(dme)W≡C$^t$Bu in 10 ml of CH$_2$Cl$_2$ in a molar ratio of 5-cyano-2-norbornene: Cl$_3$(dme)W≡C$^t$Bu=75:1. For this, 50 mg (111 μmoles) of Cl$_3$(dme)W≡C$^t$Bu were weighed out. Poly(5-cyano-2-norbornene) was obtained in 37% yield. The poly(5-cyano-2-norbornene) formed had a molecular weight $\overline{M}_w$=7660 g/mole, and the polymer dispersity was D=1.57.

Example 7

Polymerisation of 5-cyano-2-norbornene with Cl$_3$(dme)W≡C$^t$Bu as Catalyst in Bulk Similarly to Example 5, 5-cyano-2-norbornene was reacted with the tungsten-carbyne complex Cl$_3$(dme)W≡C$^t$Bu in bulk. For this, 23 mg (51 μmoles) of Cl$_3$(dme)W≡C$^t$Bu were weighed out. With a monomer-catalyst molar ratio of 5-cyano-2-norbornene: Cl$_3$(dme)W≡C$^t$Bu=500:1, poly(5-cyano-2-norbornene) was obtained in 18.7% yield. This polymer had a $\overline{M}_w$ of 17630 g/mole and a molecular weight distribution of D=1.2.

Example 8

Polymerisation of 5-cyano-2-norbornene with Np$_3$W≡C$^t$Bu as Catalyst in Solution Similarly to Example 4, 5-cyano-2-norbornene was reacted with the tungsten-carbyne complex Np$_3$W≡C$^t$Bu as catalyst in 10 ml of hexane as solvent. For this, 78 mg (167.8 μmoles) of NP$_3$W≡C$^t$Bu were weighed out. Poly(5-cyano-2-norbornene) was obtained in 31.1% yield. This polymer had a molecular weight of $\overline{M}_w$=214,600 g/mole. The polymer dispersity of this polymer was D=6.7.

Example 9

Comparison

Polymerisation of cyclopentene with ($^t$BuO)$_3$W≡C$^t$Bu as Catalyst in Solution The polymerisation was carried out similarly to Example 4. Instead of 5-cyano-2-norbornene, 202 mg (2.96 mmoles) of cyclopentene were weighed out with a monomer-catalyst ratio of cyclopentene: ($^t$BuO)$_3$W≡C$^t$Bu=100:1. Decane was used as solvent. The yield of poly(cyclopentene) was 69.4%. The poly(cyclopentene) formed had a molecular weight of $\overline{M}_w$=100,300 g/mole, and the polymer dispersity was D=2.91.

Example 10

Comparison

Polymerisation of dicyclopentadiene with ($^t$BuO)$_3$W≡C$^t$Bu as Catalyst in Solution The polymerisation was carried out similarly to Example 4. Instead of 5-cyano-2-norbornene, 616 mg (4.66 μmoles) of dicyclopentadiene were weighed out with a monomer-catalyst ratio of dicyclopentadiene: ($^t$BuO)$_3$W≡C$^t$Bu=100:1. A mixture of 10 ml of CH$_2$Cl$_2$ and 5 ml of hexane was used as solvent. The yield of poly(dicyclopentadiene) was 99%. The poly(dicyclopentadiene) formed had a molecular weight of $\overline{M}_w$=158,900 g/mole, and the polymer dispersity was D=3.5.

Example 11

Synthesis of the New 5-cyano-5-octyl-2-norbornene

To form an octyl-substituted 5-cyano-2-norbornene, 5.9 ml (5.84 g=49.4 mmoles) of 5-cyano-2-norbornene were dissolved in 60 ml of THF in a 200 ml Schlenk tube that had previously been rendered inert, and cooled to −78° C. (dry ice/isopropanol). 6.02 g (56.2 mmoles) of lithium diisopropylarnide (LDA) were then added in portions under argon. This reaction solution was then stirred for 1 hour at −78° C. Following this 13 ml (11.24 g=75.6 mmoles) of octyl chloride were slowly added under argon and the reaction solution was stirred for a further hour at −78° C. The batch was then allowed to heat up to room temperature, the LiCl that was formed was allowed to settle, and the supernatant solution was decanted. The orange-coloured solution was concentrated by evaporation in vacuo ($10^{-3}$ mbar) and then distilled in vacuo: yellowish liquid: b.p. ($10^{-3}$ mbar): 120°–125° C., yield: 6.4 g=56.1% (referred to 49.4 mmoles of 5-cyano-2-norbornene). Isomer distribution (determined by gas chromatography): 4.95% exo and 92.6% endo. Characterisation: density: 0.88 g/ml (determined by weighing 1 ml of 5-cyano-5-octyl-2-norbornene).

$^1$H-NMR, (250 MHz, CDCl$_3$)δ=6.23 (H-2 and 3), 2.81 (H-4), 2.88 (H-1), 1.61 (H-9), 1.41 (H-10 to 15), 1.24 (H-6 and 7), 0.81 (H-16) ppm.

$^{13}$C-NMR, (63 MHz, CDCl$_3$)δ=138.6 (C-2), 135.1 (C-3), 124.8 (C-8), 49.7 (C-7),48.6 (C-4), 42.3 (C-1), 42.2 (C-5), 40.3 (C-6), 39.3 (C-10), 31.6 (C-14), 29.4 (C-13), 29.3 (C-12), 29.1 (C-11), 26.2 (C-9), 22.3 (C-15), 13.8 (C-16) ppm.

Example 12

Polymerisation of 5-cyano-5-octyl-2-norbornene with $(^tBuO)_3W\equiv C^tBu$ as Catalyst in Solution The polymerisation was carried out similarly to Example 4. Instead of 5-cyano-2-norbornene, 1500 mg (6.0 mmoles) of 5-cyano-5-octyl-2-norbornene were weighed out in a monomer-catalyst ratio of 5-cyano-5-octyl-2-norbornene: $(^tBuO)_3W\equiv C^tBu=500:1$. 5 ml of $CH_2Cl_2$ were used as solvent. The yield of poly(5-cyano-5-octyl-2-norbornene) was 76%. The poly(5-cyano-5-octyl-2-norbornene) formed had a molecular weight of $\overline{M}_w=559,700$ g/mole, and the polymer dispersity was D=3.38.

Example 13

Copolymerisation of 5-cyano-2-norbornene and Dicyclopentadiene with $(^tBuO)_3W\equiv C^tBu$ as Catalyst (Equimolar Monomer Amounts)

464 mg (3.9 mmoles) of 5-cyano-2-norbornene and 516 mg (3.9 mmoles) of dicyclopentadiene were weighed out into a 200 ml Schlenk tube that had been rendered inert, and dissolved in 10 ml of $CH_2Cl_2$ and 5 ml of hexane (and in 0.5 ml of decane as internal standard for the conversion determination by gas chromatography). 19 mg (39 µmoles) of $(^tBuO)_3W\equiv C^tBu$ were weighed out into a 10 ml Schlenk tube and dissolved in 1 ml of $CH_2Cl_2$. The molar ratio of 5-cyano-2-norbornene:dicyclopentadiene:$(^tBuO)_3W\equiv C^tBu$ is 100:100:1. The copolymerisation is started by addition of the catalyst solution to the monomer solution. The Schlenk tube is placed in a thermostatically controlled water bath (25° C.). During the reaction samples were taken for the conversion determination by gas chromatography. After a reaction time of 24 hours the reaction is terminated with 0.1 ml of benzaldehyde, the polymer is precipitated in 100 ml of methanol, filtered, and dried at 25° C. to constant weight in vacuo ($10^{-3}$ mbar). A white copolymer is formed. Yield 812 mg=90% of poly (5-cyano-2-norbornene/dicyclopentadiene). The molecular weight was 140,500 g/mole, D=2.47.

Example 14

Copolymerisation of 5-cyano-2-norbornene and Dicyclopentadiene with $(^tBuO)_3W\equiv C^tBu$ as Catalyst (Equimolar Monomer Amounts)

The copolymerisation was carried out similarly to Example 13. However, 20 mg (42.3 µmoles) of $(^tBuO)_3W\equiv C^tBu$, 504 mg (4.23 mmoles) of 5-cyano-2-norbornene and 560 mg (4.23 mmoles) of dicyclopentadiene were weighed out. The reaction time was reduced to 90 minutes. The yield of poly(5-cyano-2-norbornene/dicyclopentadiene) was 57%. The poly(5-cyano-2-norbornene/dicyclopentadiene) formed had a molecular weight of $\overline{M}_w=215,000$ g/mole, and the polymer dispersity was D=2.17.

Example 15

Copolymerisation of 5-cyano-2-norbornene and Dicyclopentadiene with $(^tBuO)_3W\equiv C^tBu$ as Catalyst (Different Monomer Ratios)

The reaction is carried out similarly to Example 13. However, 18 mg (38.1 µmoles) of $(^tBuO)_3W\equiv C^tBu$, 454 mg (3.8 mmoles) of 5-cyano-2-norbornene and 252 mg (1.9 mmoles) of dicyclopentadiene were weighed out. The molar ratio 5-cyano-2-norbornene:dicyclopentadiene: $(^tBuO)_3W\equiv C^tBu$ is 100:50:1. After a reaction time of 24 hours a THF-soluble (GPC measurement) copolymer was obtained in 94% yield ($\overline{M}_w=349,150$ g/mole, D=2.75).

Example 16

Copolymerisation of 5-cyano-2-norbornene and Dicyclopentadiene with $(^tBuO)_3W\equiv C^tBu$ as Catalyst (Different Monomer Ratios)

The reaction is carried out similarly to Example 15. However, 56 mg (0.4 mmole) of dicyclopentadiene were weighed out. The molar ratio 5-cyano-2-norbornene:dicyclopentadiene:$(^tBuO)_3W\equiv C^tBu$ is 100:11:1. After a reaction time of 24 hours a THF-soluble (GPC measurement) copolymer was obtained in 98% yield ($\overline{M}_w=184,220$ g/mole, D=2.71).

Example 17

Copolymerisation of 5-cyano-2-norbornene and Dicyclopentadiene with $(^tBuO)_3W\equiv C^tBu$ as Catalyst (Different Monomer Ratios)

The reaction is carried out similarly to Example 13. However, 16 mg (33.9 µmoles) of $(^tBuO)_3W\equiv C^tBu$, 404 mg (3.4 mmoles) of 5-cyano-2-norbornene and 895 mg (6.8 mmoles) of dicyclopentadiene were weighed out. The molar ratio 5-cyano-2-norbornene:dicyclopentadiene: $(^tBuO)_3W\equiv C^tBu$ is 100:200:1. After a reaction time of 24 hours a THF-soluble (GPC measurement) copolymer was obtained ($\overline{M}_w=389,400$ g/mole, D =2.96).

Example 18

Copolymerisation of 5-cyano-2-norbornene and Dicyclopentadiene with $(^tBuO)_3W\equiv C^tBu$ as Catalyst (Different Monomer Ratios)

The reaction was carried out similarly to Example 13. However, 7 mg (14.8 µmoles) of $(^tBuO)_3W\equiv C^tBu$, 392 mg (3.0 mmoles) of 5-cyano-2-norbornene and 353 mg (3.0 mmoles) of dicyclopentadiene were weighed out. The reaction time was shortened to 5 minutes. The molar ratio 5-cyano-2-norbornene:dicyclopentadiene:$(^tBuO)_3W\equiv C^tBu$ was 200:200:1. The yield was 15%, the molecular weight $\overline{M}_w=182,300$ g/mole, and the polymer dispersity D=1.6.

Example 19

Copolymerisation of 5-cyano-2-norbornene and Dicyclopentadiene with $(^tBuO)_3W\equiv C^tBu$ as Catalyst (Different Monomer Ratios)

The reaction was carried out similarly to Example 13. However, 7 mg (221 µmoles) of $(^tBuO)_3W\equiv C^tBu$, 793 mg (6.63 mmoles) of 5-cyano-2-norbornene and 294 mg (2.21 mmoles) of dicyclopentadiene were weighed out. This corresponds to a molar ratio of 5-cyano-2-norbornene:dicyclopentadiene:$(^tBuO)_3W\equiv C^tBu= 300:100:1$. The yield was 20%, the molecular weight $\overline{M}_w=122,800$ g/mole, and the polymer dispersity D=1.6.

Example 20

Copolymerisation of 5-cyano-2-norbornene and Cyclopentene with $(^tBuO)_3W\equiv C^tBu$ as Catalyst (Equimolar Monomer Amounts)

The copolymerisation was carried out similarly to Example 13. However, 18 mg (38.1 µmoles) of $(^tBuO)_3W\equiv C^tBu$, 455 mg (3.81 mmoles) of 5-cyano-2-norbornene and 260 mg (3.81 mmoles) of cyclopentene were weighed out. With a molar ratio of 5-cyano-2-norbornene:cyclopentene:($^t$BuO)$_3$W≡C$^t$Bu=100:100:1, a copolymer was obtained in 28% yield. $\overline{M}_w$=128,500 g/mole, D=2.35.

Example 21

Copolymerisation of 5-cyano-2-norbornene and Cyclopentene with ($^t$BuO)$_3$W≡C$^t$Bu as Catalyst (Equimolar Monomer Amounts)

The copolymerisation was carried out similarly to Example 13. However, 18 mg (38.1 µmoles) of ($^t$BuO)$_3$W≡C$^t$Bu, 908 mg (7.62 mmoles) of 5-cyano-2-norbornene and 520 mg (7.62 mmoles) of cyclopentene were weighed out. With a molar ratio of 5-cyano-2-norbornene:cyclopentene:($^t$BuO)$_3$W≡C$^t$Bu=200:200:1, a copolymer was obtained in 21% yield. $\overline{M}_w$=216,000 g/mole, D=5.

Example 22

Copolymerisation of 5-cyano-2-norbornene and Cyclopentene with ($^t$BuO)$_3$W≡C$^t$Bu as Catalyst (Equal Monomer Amounts)

The copolymerisation was carried out similarly to Example 13. However, 2 ml of decane and 2 ml of THF were used as solvent. A copolymer was obtained in 34% yield having a molecular weight $\overline{M}_w$=366,400 g/mole (D=3.47).

Example 23

Copolymerisation of 5-cyano-2-norbornene and Cyclopentene with ($^t$BuO)$_3$W≡C$^t$Bu as Catalyst (Equal Monomer Amounts)

The copolymerisation was carried out similarly to Example 13. However, 1 ml of CH$_2$Cl$_2$ was used as solvent. A copolymer was obtained in 55% yield having a molecular weight $\overline{M}_w$=397,900 g/mole (D=2.63).

Example 24

Copolymerisation of 5-cyano-2-norbornene and Cyclopentene with ($^t$BuO)$_3$W≡C$^t$Bu as Catalyst (Different Monomer Amounts)

The copolymerisation was carried out similarly to Example 13. However, 11 mg (22.1 µmoles) of ($^t$BuO)$_3$W≡C$^t$Bu, 793 mg (6.63 mmoles) of 5-cyano-2-norbornene and 294 mg (2.21 mmoles) of cyclopentene were weighed out. A molar ratio of 5-cyano-2-norbornene:cyclopentene:($^t$BuO)$_3$W≡C$^t$Bu=300:100:1 was adjusted. 1,2-dichloroethane (C$_2$H$_4$Cl$_2$) was used as solvent. Poly(5-cyano-2-norbornene/cyclopentene) was obtained in 64% yield. The molecular weight of this copolymer was $\overline{M}_w$=484,500 g/mole. A DSC measurement of this copolymer gave a glass transition temperature $T_g$=109° C.

Example 25

Synthesis of 5-decyl-2-norborene (NBEC$_{10}$H$_{21}$)

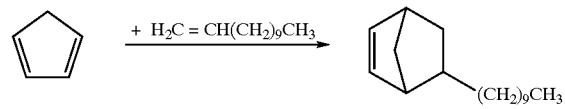

In order to prepare 5-decyl-2-norbornene, as a modification of the synthesis of T. Sagane and A. Mizuno cyclopentadiene was first of all freshly prepared by thermal cracking of dicyclopentadiene (b.p.: 40° C.). (According to Hünig, Märkl, Sauer, "*Integriertes Organisches Praktikum*" 1979, 78–79.)

85 ml of 1-dodecene (0.66 mole) and 17 ml of cyclopentadiene (0.33 mole) were then added to a 200 ml manual autoclave with glass insert, and the autoclave was closed and heated to 200° C. The pressure rose to 10 bar. After 30 minutes the heating was switched off and the autoclave was allowed to cool to room temperature. The yellowish liquid was distilled twice in vacuo. B.p. (10$^{-3}$ mbar): 120° C., yield: 33 g=42.7%; colourless liquid, exo-5-decyl-2-norbornene: 4.5%; endo-5-decyl-2-norbornene: 91.5%.

The NMR data correspond to the literature data of T. Sagane and A. Mizuno. (T. Sagane, A. Mizuno, Makromol. Chem. 1993, 194, 37–52)

Example 26

Copolymerisation of 5-cyano-2-norbornene and 5-decyl-2-norbornene with ($^t$BuO)$_3$W≡C$^t$Bu as Catalyst in Solution 844 mg (3.6 mmoles) of 5-decyl-2-norbornene and 429 mg (3.6 mmoles) of 5-cyano-2-norbornene are dissolved in 10 ml of CH$_2$Cl$_2$ and 5 ml of hexane in a 200 ml Schlenk tube that had previously been rendered inert. For the conversion determination by gas chromatography 0.5 ml of decane is added as internal standard. 17 mg (0.036 mmole) of ($^t$BuO)$_3$W≡C$^t$Bu are weighed out into a 50 ml Schlenk tube and dissolved in 1 ml of CH$_2$Cl$_2$. The molar ratio 5-cyano-2-norbornene:5-decyl-2-norbornene:($^t$BuO)$_3$W≡C$^t$Bu=100:100:1. The Schlenk tube is thermostatically controlled water bath (25° C.). The polymerisation is started by adding the catalyst solution to the monomer solution. After 24 hours the reaction is terminated with 0.1 ml of benzaldehyde and the polymer is precipitated with 100 ml of methanol and filtered. For purposes of purification the polymer is dissolved in 10 ml of CH$_2$Cl$_2$ and reprecipitated in 100 ml of methanol, and filtered and dried to constant weight at 25° C. in vacuo (10$^{31\ 3}$ mbar). The yield of polymer is 1040 mg=82%. The copolymer formed had a molecular weight of $\overline{M}_w$=182,800 g mole$^{-1}$, and the dispersity was D=2.66. In experiments with a large proportion of 5-decyl-2-norbornene in the starting mixture copolymers were obtained having rubber-like properties (low $T_g$). If 5-cyano-2-norbornene was used in excess, then fibre-like copolymers were obtained having a high $T_g$.

What is claimed is:

1. A process for the polymerization of polar substituted cycloalkenes, optionally in the presence of one or more further unsaturated compounds, comprising the step of carrying out polymerization in the presence of one or more tungsten-carbyne complexes and/or molybdenum-carbyne complexes, wherein the polar substituents are selected from the group consisting of —CN, halogen, —CF$_3$, —C$_3$F$_5$ to C$_{20}$—F$_{41}$, —N(C$_1$-C$_{20}$alkyl)$_2$, C$_1$-C$_{20}$-alkylene-COOC$_1$-C$_{20}$-alkyl, and —OH.

2. A process according to claim 1 wherein the polmerization is carried out in the absence of a solvent.

* * * * *